United States Patent
McMindes et al.

(10) Patent No.: US 7,303,778 B2
(45) Date of Patent: Dec. 4, 2007

(54) LOW CARBOHYDRATE COATING SYSTEM FOR BREADED FOODS

(75) Inventors: Matthew K. McMindes, Chesterfield, MO (US); Steven Moore, Bedford, VA (US)

(73) Assignee: SOLAE, LLC, St. Louis, MO (US)

( * ) Notice: Subject to any disclaimer, the term of this patent is extended or adjusted under 35 U.S.C. 154(b) by 0 days.

(21) Appl. No.: 10/832,664

(22) Filed: Apr. 27, 2004

(65) Prior Publication Data

US 2005/0238791 A1    Oct. 27, 2005

(51) Int. Cl.
    *A23J 1/00*    (2006.01)
(52) U.S. Cl. ..................... 426/656; 426/634
(58) Field of Classification Search ............... 426/656, 426/634
    See application file for complete search history.

(56) References Cited

U.S. PATENT DOCUMENTS

| | | | |
|---|---|---|---|
| 4,208,442 A | | 6/1980 | Evans et al. |
| 4,640,837 A | * | 2/1987 | Coleman et al. ............ 426/94 |
| 4,943,438 A | | 7/1990 | Rosenthal |
| 5,019,406 A | * | 5/1991 | Ang et al. .................. 426/302 |
| 5,246,719 A | * | 9/1993 | Rao et al. .................... 426/92 |
| 5,266,339 A | | 11/1993 | Samson et al. |
| 5,350,585 A | | 9/1994 | Sunderland |
| 5,429,831 A | * | 7/1995 | Williams et al. ............. 426/92 |
| 5,527,549 A | * | 6/1996 | Bernacchi et al. ............ 426/89 |
| 5,736,178 A | * | 4/1998 | Cook et al. .................. 426/93 |
| 5,770,252 A | * | 6/1998 | McEwen et al. ............ 426/292 |
| 5,924,356 A | | 7/1999 | Harper et al. |
| 5,936,069 A | | 8/1999 | Johnson |
| 6,093,426 A | * | 7/2000 | Tai et al. ..................... 426/94 |
| 6,162,481 A | * | 12/2000 | Bernacchi et al. .......... 426/549 |
| 6,291,009 B1 | | 9/2001 | Cohen |
| 6,391,374 B1 | | 5/2002 | Gray et al. |
| 6,479,089 B2 | | 11/2002 | Cohen |
| 6,524,639 B1 | | 2/2003 | Rogols et al. |
| 2003/0108654 A1 | | 6/2003 | Blaun |
| 2003/0134023 A1 | | 7/2003 | Anfinsen |
| 2004/0043106 A1 | | 3/2004 | Anfinsen et al. |

FOREIGN PATENT DOCUMENTS

JP            63068061      *    3/1987

OTHER PUBLICATIONS

Derwent Abstract. Acc No. 1975-63239W. For JP 75025533 published Aug. 1975.*

* cited by examiner

*Primary Examiner*—Anthony Weier
(74) *Attorney, Agent, or Firm*—James L. Cordek; Holly M. Amjad

(57) ABSTRACT

This invention is directed to a protein containing composition for coating a food product, containing a liquid batter protein material having a liquid and a soy protein material wherein the weight ratio of liquid to soy protein material is from about 3-20 to 1; and a soy fiber material; wherein the food product coating has a non-fiber carbohydrate content of not more than 5 grams non-fiber carbohydrate per serving. Said invention may also include a pre-dust protein material; a breading protein material containing at least 50% soy protein by weight on a moisture free basis; and a liquid clear coat protein material.

20 Claims, No Drawings

LOW CARBOHYDRATE COATING SYSTEM FOR BREADED FOODS

FIELD OF THE INVENTION

The present invention relates to a low non-fiber carbohydrate coating composition for coating food products. A salient feature of the invention is in the use of a protein material which is derived from soybeans as either a soy protein flour, a soy protein concentrate or as a soy protein isolate.

BACKGROUND OF THE INVENTION

Nutrition and dietary factors play important roles in health promotion and chronic disease prevention. See, for example: 1) McGinnis J M, Foege W H. Actual causes of death in the United States. JAMA. 1993; 270:2207-2212; 2) Committee on Diet and Health, Food and Nutrition Board, Commission on Life Sciences, National Research Council. Diet and Health: Implications for Reducing Chronic Disease Risk. Washington, D.C.: National Academy Press; 1989; and 3) The Surgeon General's Report on Nutrition and Health. Washington, D.C.: US Dept of Health and Human Services; 1988 and DHHS (PHS) publication No. 88-50210. The Surgeon General's report states, "For two out of three adult Americans who do not smoke and do not drink excessively, one personal choice seems to influence long-term health prospects more than any other: what we eat." (p 1).

People process foods differently and are faced with choices for health and self-image. Low-carbohydrate diets are available for many people who either cannot or choose not to consume large amounts of foods containing refined carbohydrates, such as sugars and starches. These diets are premised on the principal that excess carbohydrates are important factors for many for creating and storing large amounts of body fat.

Low-carbohydrate diets differ from those advocated by many traditional nutrition authorities who favor diets based on the so-called "food pyramid", whose foundation rests on consumption of large amounts of high carbohydrate foods. The food pyramid lists foods without accounting for a need for restriction on carbohydrate intake. Thus, all fruits and vegetables and grains figure prominently in that view of a healthy diet. Low-carbohydrate diets, on the other hand, typically prohibit or severely limit all foods containing starches and sugars, including all grains, cereals, potatoes, and foods made with them. Allowed foods for a low-carbohydrate weight loss diet include meats, poultry, fish, shellfish, fats/oils, some dairy products (heavy cream, butter, and some cheeses), all green and other non-starchy vegetables, and a few other relatively low carbohydrate fruits.

There are also very significant differences between "low-fat" and "low-carbohydrate" diets. A diet simply restricting calories can reduce the intake of protein and fat and burns large amounts of both fat and muscle to provide fuel. These diets help an individual to lose weight, but may result in loss of muscle and reduction in basal metabolic rate. The result can be an increased need to cut calories.

On an effective low-carbohydrate diet, the body burns mostly fat and preserves lean muscle tissue. Exercise can add muscle while losing fat, thereby increasing a subject's basal metabolic rate, and enhancing the loss of fat. According to some studies, carbohydrates act very much like an addictive drug for some people. The more they eat, the more they crave those foods. On a low-carbohydrate diet, once past the initial few days, those cravings can significantly diminish, or disappear completely.

There is a need for low-carbohydrate foods of greater variety than naturally occur to enable those on low-carbohydrate diets to eat many of the foods they are accustomed to but on a carbohydrate restricted or prohibited list. Among the needed new foods are low-carbohydrate coated or breaded food products, because people like breaded foods, be they baked or fried, but they are essentially employed in conventional diets as a rich source of carbohydrates. To date, however, there are no known suitable low-carbohydrate coatings or breading for food products, dry mixes for their preparation or processes suitable to the task.

Carbohydrates can be defined in three ways; structurally (based on molecular structure), analytically (such as, for example, as defined by Federal labeling regulations), and physiologically (based on glycemic impact).

Carbohydrates defined structurally include compounds composed of at least one basic monosaccharide unit. Under this definition, carbohydrates may be further classified as simple carbohydrates and complex carbohydrates. Simple carbohydrates are monosaccharides and disaccharides. Complex carbohydrates are polysaccharides, or large molecules composed of straight or branched chains of monosaccharides.

For labeling purposes, the Food and Drug Administration (FDA) has declared that the total carbohydrate content of a food "shall be calculated by subtraction of the sum of the crude protein, total fat, moisture and ash from the total weight of the product." Such a measurement of carbohydrate content is not precise. For example, errors in the measurement of the food components being subtracted carry over into the determination of carbohydrate content. When measuring carbohydrate content in low-carbohydrate foods, such errors can typically be up to twenty to one hundred percent. (FAO/WHO Expert Panel on Carbohydrates. Carbohydrates in Human Nutrition/Total Carbohydrate Section; Rome, Italy (1997), http://hipocrates.univalle.edu.co/estudi/car-bohyd.htm.) Additionally, since only the enumerated food components are subtracted, the FDA definition of carbohydrates includes components such as, lignin, gums, pectin and other fibers; as well as waxes, tannins, some Maillard products, flavonoids, organic acids, and polyols. Accordingly, the FDA definition of carbohydrates can include components which are not structural carbohydrates.

Carbohydrates defined physiologically are structural carbohydrates which elicit an immediate and significant impact on blood glucose and plasma insulin. Such carbohydrates are termed "glycemic carbohydrates," "digestible carbohydrates" or "available carbohydrates." Structural carbohydrates which do not elicit a significant impact on blood glucose and insulin are termed "non-glycemic carbohydrates."

The Food and Drug Administration (FDA) nutritional labeling requirements do not distinguish between glycemic carbohydrates and non-glycemic carbohydrates. For example, the FDA definition lumps together sugars and starches which have an immediate and significant impact on blood glucose, with fiber which does not impact blood glucose, as well as polyols, which have little, if any, impact on blood glucose.

Glycemic carbohydrates include simple carbohydrates, and some complex carbohydrates. After consumption, simple carbohydrates are rapidly absorbed by the small intestine, while some complex carbohydrates are typically broken down into simple carbohydrates and then absorbed. After absorption, these simple carbohydrates can elicit a rise in blood glucose levels. Non-glycemic complex carbohydrates, and some of the compounds labeled as carbohydrates on "nutritional facts" panels under the FDA definition, are not broken down into simple carbohydrates or significantly absorbed in the small intestine, but pass into the colon where they may be fermented by bacteria, or pass through the gut intact. Molecules that are not absorbed in the small intestine do not produce a rise in blood glucose levels.

SUMMARY OF THE INVENTION

In one embodiment, this invention is directed to a protein containing composition for coating a food product, comprising;

a liquid batter protein material comprising a liquid and a soy protein material wherein the weight ratio of liquid to soy protein material is from about 3-20 to 1;

and a soy fiber material;

wherein the food product coating has a non-fiber carbohydrate content of not more than 5 grams non-fiber carbohydrate per serving.

In a second embodiment, the composition further comprises a pre-dust protein material in addition to the liquid batter protein material and the soy fiber material.

In a third embodiment, the composition comprises a liquid batter protein material comprising a liquid and a soy protein material wherein the weight ratio of liquid to soy protein material is from about 3-20 to 1;

a breading protein material containing at least 50% soy protein by weight on a moisture free basis;

and a soy fiber material;

wherein the food product coating has a non-fiber carbohydrate content of not more than 5 grams non-fiber carbohydrate per serving.

In a fourth embodiment, the composition further comprises a pre-dust protein material in addition to the liquid batter protein material, the breading protein material and the soy fiber material wherein the pre-dust protein material contains at least 50% soy protein by weight on a moisture free basis.

In a fifth embodiment, the composition comprises a liquid clear coat protein material in addition to the liquid batter protein material, the breading protein material, the pre-dust protein material and the soy fiber material. The liquid clear coat protein material comprises a liquid and a soy protein material wherein the weight ratio of liquid to soy protein material is from about 3-40 to 1.

DETAILED DESCRIPTION OF THE INVENTION

Most health experts recommend that 45-55% of a person's daily calories should come from carbohydrates. The term "carbohydrates," is defined as structural carbohydrates composed of at least one basic monosaccharide unit. Most of the carbohydrates should be complex carbohydrates rather than simple carbohydrates like sugar and starch. Nutrient-rich foods (grain products, fruits, vegetables, legumes and milk) are best since they supply vitamins, mineral and fiber.

Zero or very low non-fiber carbohydrate coating systems address the life style demands of carbohydrate conscious consumers who are looking for ways to enjoy fried breaded products with little concern for the carbohydrate content typical of such foods. Traditional breaded products such as chicken nuggets, chicken strips, bone-in chicken, mozzarella cheese sticks, shrimp, country fried steak and meat-free nuggets are high in non-fiber carbohydrates (inherent in wheat, corn and rice flour or starch coatings), reducing typical breaded product consumption in low carbohydrate diets. These traditional breaded products are also high in the starch content of the wheat, corn and rice flour.

The food products that are coated within the present invention comprise meat and non-meat products. Meats that are coated comprise beef, pork, lamb and poultry. The meat product may have a bone-in meat product or a de-boned meat product. The meat product may be of a small or bite size portion as a nugget, as well as a single serving piece such as a chicken breast or chicken drum stick. Non-meat products include seafood, cheese and vegetables The seafood, may be as small pieces as in popcorn shrimp and fish sticks or of a larger size as in a fillet of fish. The cheese typically is a cheese stick. Vegetables include, but are not limited to broccoli, mushrooms, zucchini and asparagus. A meatless entrée is defined as an entrée with no meat. As a meatless entrée, there is mozzarella in carozza which is a portion of cheese between two slices of bread that is battered and cooked or battered, breaded and cooked. Another meatless entrée is eggplant parmesan wherein the eggplant is battered, breaded and cooked. The various food products, once coated according to the present invention are either cooked, partially cooked for finishing at a later time or frozen either in an uncooked state, partially cooked state or cooked state. Cooking includes frying either as sautéing or as deep frying or baking.

The present invention, at a minimum, relates to a coating system wherein a food product is dipped into a liquid batter protein material or the liquid batter protein material is applied to the food product. An alternative embodiment relates to pre-dusting the food product with a pre-dust protein material, followed by the liquid batter protein material. Another embodiment relates to a coating system wherein a food product is dipped into a liquid batter protein material or the liquid batter protein material is applied to the food product and then coated with a breading protein material. An alternative embodiment relates to pre-dusting the food product with a pre-dust protein material, followed by the liquid batter protein material and the breading protein material. Another alternative embodiment relates to pre-dusting the food product with a pre-dust protein material, followed by the liquid batter protein material, the breading protein material and then by a liquid clear coat protein material. Soy fiber is present in at least one of the liquid batter protein material, the breading protein material, the pre-dust protein material and the clear coat protein material.

Typically the starch content of wheat flour or of corn flour is greater than 70%. In the present invention, the starch content of the various components of the food product coating of a liquid batter protein material, the breading protein material, the pre-dust protein material and the clear coat protein material each contain less than 1% starch, preferably less than 0.5% starch and most preferably less than 0.25% starch. Further, the food product coating of the liquid batter protein material or the food product coating of the pre-dust protein material liquid and the liquid batter protein material or the food product coating of the liquid batter protein material and the breading protein material; or the food product coating of the pre-dust protein material, the liquid batter protein material and the breading protein material; or the food product coating of the pre-dust protein material, the liquid batter protein material, the breading protein material and the clear coat protein material, each have a non-fiber carbohydrate content of not more than 5 grams non-fiber carbohydrate per serving, preferably not more than 2.5 grams non-fiber carbohydrate per serving and most preferably not more than 1 gram non-fiber carbohydrate per serving.

Food products usually have a "Nutrition Facts" label. The label states the serving size and amount per serving of calories, calories from fat, total fat, saturated fat, cholesterol, sodium, total carbohydrates, dietary fiber, sugars and protein. Non-fiber carbohydrates per serving is determined by subtracting the dietary fiber per serving from the total carbohydrates per serving. For example, a pasta product having a 56 gram serving with a total carbohydrates per serving of 42 grams wherein dietary fiber per serving is 2 grams has a non-fiber carbohydrates per serving of 42-2 or 40 grams per serving of non-fiber carbohydrates. A 113 gram serving of a chicken breast breaded with the coating composition of the present invention with a total carbohydrates per serving of 3 grams and dietary fiber per serving of 2 grams has a non-fiber carbohydrates per serving of 3-2 or 1 gram per serving of non-fiber carbohydrates.

Regardless of the embodiment employed, a material common to the above components is soybeans.

The term "soy protein" typically refers to processed, edible dry soybean products other than animal feed meals. Many types are produced for use in human and pet foods and milk replacers and starter feeds for young animals.

Soybean protein materials which are useful within the present invention are soy protein flour, soy protein concentrate and soy protein isolate, or mixtures of each with the other.

The traditional processes for making the soy protein materials including soy protein flours, soy protein concentrates and soy protein isolates, all begin with the same initial steps. Soybeans entering a processing plant must be sound, mature, yellow soybeans. The soybeans can be washed to remove dirt and small stones. They are typically screened to remove damaged beans and foreign materials, and may be sorted to uniform size.

Each cleaned raw soybean is then cracked into several pieces, typically six (6) to eight (8), to produce soy chips and hulls. The hulls are removed by aspiration. Alternatively, the hulls may be loosened by adjusting the moisture level and mildly heating the soybeans before cracking. Hulls can also be removed by passing cracked pieces through corrugated rolls revolving at different speeds. In these methods, the hulls are then removed by a combination of shaker screen and aspiration.

The soy chips, which contain about 11% moisture, are then conditioned at about 60° C. and flaked to about 0.25 millimeter thickness. The resulting flakes are then extracted with an inert solvent, such as a hydrocarbon solvent, typically hexane, in one of several types of countercurrent extraction systems to remove the soybean oil. Hexane extraction is basically an anhydrous process, as with a moisture content of only about 11%, there is very little water present in the soybeans to react with the protein. For soy protein flours, soy protein concentrates and soy protein isolates, it is important that the flakes be desolventized in a manner which minimizes the amount of cooking or toasting of the soy protein to preserve a high content of water-soluble soy protein. This is typically accomplished by using vapor desolventizers or flash desolventizers. The flakes resulting from this process are generally referred to as "edible defatted flakes." Specially designed extractors with self-cleaning, no-flake-breakage features, and the use of a narrow boiling range hexane are recommended for producing edible defatted flakes.

The resulting edible defatted flakes, which are the starting material for soy protein flour, soy protein concentrate and soy protein isolate, have a protein content of approximately 50%. Moisture content has typically been reduced by three (3) to five (5)% during this process. Any residual solvent may be removed by heat and vacuum.

The soy protein flour, soy protein concentrate and soy protein isolate are described below as containing a protein range based upon a "moisture free basis" (mfb).

The edible defatted flakes are then milled, usually in an open-loop grinding system, by a hammer mill, classifier mill, roller mill or impact pin mill first into grits, and with additional grinding, into soy flours with desired particle sizes. Screening is typically used to size the product to uniform particle size ranges, and can be accomplished with shaker screens or cylindrical centrifugal screeners.

Soy protein flour, as that term is used herein, refers to a comminuted form of defatted soybean material, preferably containing less than 1% oil and formed of particles having a size such that the particles can pass through a No. 100 mesh (U.S. Standard) screen. Soy protein flour has a soy protein content of about 50% to about 65% on a moisture free basis (mfb). The remaining components are soy fiber material, fats, minerals, and sugars such as sucrose, raffinose and stachyose.

Soy protein concentrate, as the term is used herein, refers to a soy protein material containing from about 65% to about less than about 90% of soy protein (mfb). The remaining components are concentrates, soy fiber material, fats, minerals, and sugars such as sucrose, raffinose and stachyose. Soy protein concentrates are prepared from dehulled and defatted soy flakes by removing most of the water-soluble, non-protein constituents. The "traditional method" for preparing soy protein concentrates is by aqueous alcohol leaching. In this method, edible defatted soy flakes are leached (washed) with alcohol and water. The alcohol and water is typically 60% to 90% ethanol, and removes much of the soluble sugars. The soluble sugars are separated from the wet flakes with the soluble sugars being used for some other purpose or discarded. The wet flakes are transferred to a desolventizer. Sufficient heat is used in the desolventizer to increase the vapor pressure of the alcohol and water to remove that liquid, but is sufficiently low enough to minimize cooking of the protein. The application of reduced pressures over the liquid bearing mass also increases the rate of removal of the liquid.

The remaining water and wet flakes are dried in a dryer to remove water and to produce a soy protein concentrate.

More recently, secondary treatments such as high pressure homogenization or jet cooking are used to restore some solubility lost during processing.

Another less used method for producing soy protein concentrates is by acid leaching. Edible defatted flakes and water are combined in a ratio of about 10 to 20:1 water to edible defatted flakes, with a food-grade acid (water plus acid) typically hydrochloric acid, to adjust the pH to about 4.5. The extraction typically runs for about 30 to 45 minutes at about 40° C. The acid-leached flakes are separated from the acid solubles to concentrate the solids to about 20%. A second leach and centrifugation may also be employed. The acid solubles are used for some other purpose or are discarded. The acidified wet flakes are neutralized to a pH of about 7.0 with alkali and water (e.g., sodium hydroxide or calcium hydroxide) to produce neutralized water and wet flakes. The neutralized water is separated from the wet flakes and the wet flakes are spray dried at about 157° C. inlet air temperature and 86° C. outlet temperature to remove water and to produce soy protein concentrate. Soy protein concentrates are commercially available from Solae® LLC, for example, as Promine DSPC, Procon, Alpha 12 and Alpha 5800.

Soy protein isolate, as the term is used herein, refers to a soy protein material containing at least about 90% or greater protein content, and preferably from about 92% or greater protein content (mfb). The remaining components are soy fiber material, fats, minerals, and sugars such as sucrose, raffinose and stachyose. The edible defatted flakes are placed in an aqueous bath to provide a mixture having a pH of at least about 6.5 and preferably between about 7.0 and 10.0 in order to extract the protein. Typically, if it is desired to elevate the pH above 6.7, various alkaline reagents such as sodium hydroxide, potassium hydroxide and calcium hydroxide or other commonly accepted food grade alkaline reagents may be employed to elevate the pH. A pH of above about 7.0 is generally preferred, since an alkaline extraction facilitates solubilization of the soy protein. Typically, the pH of the aqueous extract of soy protein will be at least about 6.5 and preferably about 7.0 to 10.0. The ratio by weight of the aqueous extractant to the edible defatted flakes is usually between about 20 to 1 and preferably a ratio of about 10 to 1. Before continuing a work-up of the extract, the extract is centrifuged to remove insoluble carbohydrates. A second extraction is performed on the insoluble carbohydrates to remove any additional soy protein. The second extract is centrifuged to give any further insoluble carbohydrates and a second aqueous extract. The first and second extracts are combined for the work-up. The insoluble carbohydrates are used to obtain the soy fiber. In an alternative embodiment, the soy protein is extracted from the edible defatted flakes with water, that is, without a pH adjustment.

It is also desirable in obtaining the soy protein isolate used in the present invention, that an elevated temperature be employed during the aqueous extraction step, either with or without a pH adjustment, to facilitate solubilization of the protein, although ambient temperatures are equally satisfactory if desired. The extraction temperatures which may be employed can range from ambient up to about 120° F. with a preferred temperature of 90° F. The period of extraction is further non-limiting and a period of time between about 5 to 120 minutes may be conveniently employed with a preferred time of about 30 minutes. Following extraction of the soy protein material, the aqueous extract of soy protein can be stored in a holding tank or suitable container while a second extraction is performed on the insoluble solids from the first aqueous extraction step. This improves the efficiency and yield of the extraction process by exhaustively extracting the soy protein from the residual solids from the first step.

The combined, aqueous soy protein extracts from both extraction steps, without the pH adjustment or having a pH of at least 6.5, or preferably about 7.0 to 10, are then precipitated by adjustment of the pH of the extracts to, at or near the isoelectric point of the soy protein to form an insoluble curd precipitate. The pH to which the soy protein extracts are adjusted is typically between about 4.0 and 5.0. The precipitation step may be conveniently carried out by the addition of a common food grade acidic reagent such as acetic acid, sulfuric acid, phosphoric acid, hydrochloric acid or with any other suitable acidic reagent. The soy protein precipitates from the acidified extract, and is then separated from the extract. The separated soy protein may be washed with water to remove residual soluble carbohydrates and ash from the protein material and the residual acid can be neutralized to a pH of from about 4.0 to about 6.0 by the addition of a basic reagent such as sodium hydroxide or potassium hydroxide. At this point the soy protein material is subjected to a pasteurization step. The pasteurization step kills microorganisms that may be present. Pasteurization is carried out at a temperature of at least 180° F. for at least 15 seconds, at a temperature of at least 190° F. for at least 30 seconds or at a temperature of at least 195° F. for at least 60 seconds. The soy protein material is then dried using conventional drying means to form a soy protein isolate. Soy protein isolates are commercially available from Solae® LLC, for example, as SUPRO® 500E, SUPRO® 516 and PROPLUS 500F.

The soy protein material used in the present invention, may be modified to enhance the characteristics of the soy protein material. The modifications are modifications which are known in the art to improve the utility or characteristics of a protein material and include, but are not limited to, denaturation and hydrolysis of the protein material.

The soy protein material may be denatured and hydrolyzed to lower the viscosity. Chemical denaturation and hydrolysis of protein materials is well known in the art and typically consists of treating an aqueous soy protein material with one or more alkaline reagents in an aqueous solution under controlled conditions of pH and temperature for a period of time sufficient to denature and hydrolyze the protein material to a desired extent. Typical conditions utilized for chemical denaturing and hydrolyzing a soy protein material are: a pH of up to about 10, preferably up to about 9.7; a temperature of about 50° C. to about 80° C. and a time period of about 15 minutes to about 3 hours, where the denaturation and hydrolysis of the aqueous protein material occurs more rapidly at higher pH and temperature conditions.

Hydrolysis of the soy protein material may be effected by treating the soy protein material with an enzyme capable of hydrolyzing the soy protein. Many enzymes are known in the art which hydrolyze protein materials, including, but not limited to, fungal proteases, pectinases, lactases, and chymotrypsin. Enzyme hydrolysis is effected by adding a sufficient amount of enzyme to an aqueous dispersion of the soy protein material, typically from about 0.1% to about 10% enzyme by weight of the soy protein material, and treating the enzyme and soy protein material at a temperature, typically from about 5° C. to about 75° C., and a pH, typically from about 3 to about 9, at which the enzyme is active for a period of time sufficient to hydrolyze the soy protein material. After sufficient hydrolysis has occurred the enzyme is deactivated by heating to a temperature above 75° C., and the soy protein material is precipitated by adjusting the pH of the solution to about the isoelectric point of the soy protein material. Enzymes having utility for hydrolysis in the present invention include, but are not limited to, bromelain and alcalase.

Soy protein flour, soy protein concentrate and soy protein isolate are all commercially available at a uniform particle size. As stated above for the soy protein flour, almost all of these particles can pass through a No. 100 mesh (U.S. standard) screen. Some protein materials when made, are naturally of a large particle size. For example, the soy protein concentrate Procon 20/60 has a particle size such that almost all of this concentrate will pass through a No. 20 mesh (U.S. standard) screen and that almost all of this concentrate will be retained on a No. 60 mesh (U.S. standard) screen.

In some instances, larger particles in the batter or in the breading give the food product a better appearance and also an increase in the crunchiness of the particles.

For some coatings, it is preferred to have a soy protein material with a particle size larger than what is obtained through its normal process.

To obtain a soy protein material with a particle size larger than normal, it is necessary to re-work the soy protein material. This is accomplished by hydrating the soy protein material with water at elevated temperatures and passing the moistened soy protein material through an extruder to cause the soy protein material particles to adhere to one another. The extrudate so formed is cut into chunks and dried. The chunks are sized by conventional cutting and milling methods. Preferably the extrudate or chunks are sized to large particle crumbs that will pass through a number 10 US mesh.

Soy fiber material is characterized as a soy polysaccharide material or as the alkali insoluble residue from the soy isolate process. The soy fiber material that is employed in the present invention is preferably soy cotyledon fiber that comprises a mixture of various types of complex carbohydrates and cellulosic and hemicellulosic substances. These materials are principally cell wall structural components of the soybean cotyledons and are produced as a by product from the production of a soy protein isolate, described above.

The insoluble carbohydrate solids from the production of the soy protein isolate, described above, are dried to provide a soy dietary fiber material for use in the present invention although typically the insoluble residue is further processed in order to remove any extraneous material as described in British Patent No. 2,020,666. The soy fiber material has a typical analysis after drying of a total carbohydrate content of about 80% by weight, a protein content of about 10-18% by weight and an ash content of about 5% by weight. The dried and cleaned soy fiber material is then suitable for use in the present invention as described in more detail below.

The soy fiber is present in at least one of the components of the liquid batter protein material, the breading protein batter, the pre-dust protein material and the clear coat protein material. On a moisture free basis, the soy fiber material is present at from about 0.1-50%, preferably at from about 0.1-30% and most preferably at from about 0.1-10% by weight of the total composition.

In carrying out the present invention, a food product is dipped or covered with a liquid protein batter prior to cooking by sautéing, deep frying or baking. In an alternative embodiment, the food product is rolled or coated with a pre-dust protein material, followed by a dipping or covering of the pre-dusted food product in a liquid protein batter prior to cooking by sautéing, deep frying or baking. In another embodiment, a food product is dipped or covered with a liquid protein batter, followed by a rolling or coating of the dipped or covered food product in a breading protein prior to cooking by sautéing, deep frying or baking. Alternatively, the food product is rolled or coated with a pre-dust protein material, followed by a dipping or covering of the pre-dusted food product in a liquid protein batter, followed by a rolling or coating of the dipped or covered food product in a breading protein material prior to cooking by sautéing, deep frying or baking. In another embodiment, the food product is rolled or coated with a pre-dust protein material, followed by a dipping or covering of the pre-dusted food product in a liquid protein batter, followed by a rolling or coating of the dipped or covered food product in a breading protein material, followed by a dipping or covering of the food product in a clear coat protein material prior to cooking by sautéing, deep frying or baking.

Typically batters are comprised of flours, starches and possibly gums, salt and seasonings; Further, batters are formulated to provide specific attributes to cooked food products. One attribute is the degree of breading pickup. Food products that pickup less than 30% batter and breading relative to the weight of the food product are referred to as "battered and breaded" or just "breaded." Food products that pickup more than 30% batter and breading are referred to as "fritters." Other attributes are flavor, color, texture and appearance.

In the present invention, the batter is comprised of a soy protein material and a liquid. The liquid comprises water, milk or beer. Preferably, the liquid is water. The liquid is present in the batter at a weight ratio of from about 3-20 to 1 of liquid to soy protein and preferably at a weight ratio from about 5-15 to 1. The soy protein material employed has a starch content of not more than 1% by weight on a moisture free basis. The soy protein material employed for the batter comprises a soy protein flour, a soy protein concentrate, a soy protein isolate or mixtures thereof. Typically the soy protein material is a soy protein isolate or a mixture of a soy protein isolate and a soy protein concentrate. Other components that can be included in the batter are hydrolyzed soy proteins, soy fibers, and flavorings and seasonings such as salt, pepper and the like. The soy protein and other components are dry mixed and combined with a liquid at the above ratio. The batters are exemplified by the examples below.

BATTER EXAMPLE 1

Dry mixed are 98.5 parts of Supro® 516, a soy protein isolate; 1.0 part of HVF 53, a hydrolyzed soy protein; and 0.5 parts of soy fiber. The contents are added to a batter machine and combined with water in a water to soy protein ratio of 9 to 1 by weight.

BATTER EXAMPLE 2

Dry mixed are 31.0 parts of Supro® 516, a soy protein isolate; 61.0 parts of Promine DSPC, a soy protein concentrate; 6.5 parts of a guar gum; 1.0 part of HVF 53, a hydrolyzed soy protein; and 0.5 parts of soy fiber. The contents are added to a batter machine and combined with water in a water to soy protein ratio of 10 to 1 by weight.

BATTER EXAMPLE 3

Dry mixed are 98.5 parts of Promine DSPC, a soy protein concentrate; 1.0 part of HVF 53, a hydrolyzed soy protein; and 0.5 parts of soy fiber. The contents are added to a batter machine and combined with water in a water to soy protein ratio of 10 to 1 by weight.

The most common breadings are flour (wheat flour or mixtures of wheat flour, corn flour and rice flour), bread crumb pieces of specific size and size distribution, and Japanese crumb which are needle-like bread crumb particles of specific size and size distribution.

In the present invention, the breading is comprised of a soy protein material having at least 50% soy protein by weight on a moisture free basis (mfb) and a starch content of not more than 1% by weight on a moisture free basis. Further, the soy protein material can be a textured soy protein of a flour, concentrate or isolate. Textured soy proteins are processed to impart a structure such as a chunk, for use as a food ingredient. The soy protein material employed for the breading comprises a soy protein flour, a soy protein concentrate, a soy protein isolate or mixtures thereof. Typically the soy protein material is a soy protein isolate or a mixture of a soy protein isolate and a soy protein concentrate. Other components that can be included in the breading are hydrolyzed soy proteins, soy fibers, flavorings and seasonings such as salt, pepper and the like. The soy protein and other components are dry mixed and used as is. The breadings are exemplified by the below examples.

BREADING EXAMPLE 1

Utilized as a breading is the soy protein concentrate, Response, a texturized soy protein concentrate available from Solae, LLC, having a % protein of 70% mfb.

BREADING EXAMPLE 2

Dry mixed are 38.5 parts of Supro® 516, a soy protein isolate; 42.0 parts of Promine DSPC, a soy protein concentrate; 18.0 parts of Procon 20/60; 1.0 part of HVF 53, a hydrolyzed soy protein; and 0.5 parts of soy fiber. The % soy protein is 74% mfb.

A pre-dust is a dry coating mixture applied to a food product prior to application of the liquid batter and dry breading material. The pre-dust is typically a mixture of flours or flours and starches, gums, salt and flavorings. Further, the soy protein material can be a textured soy protein of a flour, concentrate or isolate. Typically the soy protein material is a soy protein isolate or a mixture of a soy protein isolate and a soy protein concentrate. Pre-dusts are employed to increase food substrate batter and ultimately breading pickup in preparation for cooking. In many cases, a heavy breading pickup is desired from the standpoint of product characteristic and/or product cost reduction. Typically, breadings cost significantly less than the food product. The food product typically has moisture on its surface to which a pre-dust material is able to adhere. The pre-dusted food product is then dipped in or coated with a liquid batter. The pre-dust acts as an intermediary or as a tie layer between the food product and the batter, increasing the amount of batter on the food product breaded in the absence of a pre-dust. The pre-dust is exemplified by the below example.

PRE-DUST EXAMPLE 1

Dry mixed are 98.5 parts of Supro® 516, a soy protein isolate; 1.0 part of HVF 53, a hydrolyzed soy protein; and 0.5 parts of soy fiber. The % soy protein is 87% mfb.

A clear coat typically is a very dilute starch or combined flour and starch that desiccates upon frying to form a protective film, protecting the breading from softening as a consequence of moisture pickup prior to serving. A prolonged duration between frying and serving are common occurrences in food service. Generally, fried food products that are given a clear coat prior to frying remain crispy longer following frying, compared to fried food products absent a clear coat. The clear coat is exemplified by the below example.

In the present invention, the clear coat is comprised of a soy protein material and a liquid. The liquid comprises water, milk or beer. Preferably the liquid is water. The liquid is present in the clear coat at a weight ratio of from about 3-40 to 1 of liquid to soy protein and preferably at a weight ratio of from 10-40 to 1. The soy protein employed has a starch content of not more than 1% by weight on a moisture free basis. The soy protein employed for the clear coat comprises a soy protein flour, a soy protein concentrate, a soy protein isolate or mixtures thereof. Typically the soy protein material is a soy protein isolate or a mixture of a soy protein isolate and a soy protein concentrate. Other components that can be included in the clear coat are hydrolyzed soy proteins, soy fibers, flavorings and seasonings such as salt, pepper and the like. The soy protein and other components are dry mixed and combined with a liquid at the above ratio. The clear coat is exemplified by the below examples.

CLEAR COAT EXAMPLE 1

Dry mixed are 98.5 parts of Supro® 516, a soy protein isolate; 1.0 part of HVF 53, a hydrolyzed soy protein; and 0.5 parts of soy fiber. The contents are added to a batter machine and combined with water in a water to soy protein ratio of 20 to 1 by weight.

Methods of coating food products are known to one of ordinary skill in the art and various apparatus are commercially available for carrying forth such a procedure that calls for battering, breading, pre-dusting and clear coating.

In the present invention, within the first embodiment, a food product is dipped in or coated with a liquid batter protein material followed by freezing for later cooking or partially or fully cooking for immediate or later serving. In another embodiment a food product is coated with a pre-dust protein material and the food product is then dipped in or coated with a liquid batter protein material for later cooking or partially or fully cooking for immediate or later serving. In another embodiment, a food product is dipped in or coated with a liquid batter protein material that is then breaded with a breading protein material followed by freezing for later cooking or partially or fully cooking for immediate or later serving. In another embodiment, a food product is coated with a pre-dust protein material and the product is then dipped in or coated with a liquid batter protein material that is then breaded with a breading protein material followed by freezing for later cooking or partially or fully cooking for immediate or later serving. In another embodiment, a food product is coated with a pre-dust protein material and the product is then dipped in or coated with a liquid batter protein material that is then breaded with a breading protein material followed by dipping or coating in a clear coat protein material for later cooking or partially or fully cooking for immediate or later serving.

Coated food products of the present invention are compared to a baseline coated food product in Table 1. Three 113 gram chicken strips are subjected to a pre-dusting, a liquid batter covering and a bread coating. Example A is a wheat protein control sample utilizing a wheat flour pre-dust, a wheat flour liquid batter and a wheat flour breading. Examples B and C are the soy protein inventive examples utilizing a soy protein pre-dust, a soy protein liquid batter and a soy protein breading. The amounts of pre-dust, liquid batter and breading are the same for the three samples.

TABLE 1

| | Example A | Example B | Example C |
|---|---|---|---|
| Pre-Dust | Wheat flour | Example 1 | Example 1 |
| Liquid Batter | Wheat flour | Example 1 | Example 1 |
| Breading | Wheat flour | Example 1 | Example 2 |
| Total Carbohydrates per serving | 14 grams | 3 grams | 1 gram |
| Dietary Fiber per serving | <1 gram | 2 grams | 1 gram |
| Non-Fiber Carbohydrates per serving | 13 grams | 1 gram | 1 gram |

The inventive Examples B and C have very low non-fiber carbohydrates per serving in comparison to the baseline Example A.

While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. A protein containing composition for coating a food product, consisting essentially of;
    a liquid batter protein material consisting essentially of a liquid and a soy protein material wherein the soy protein material comprises at least one of a soy protein flour, a soy protein concentrate, a soy protein isolate, or a hydrolyzed soy protein material, wherein the ratio of liquid to soy protein material is from about 3-20 to 1; and wherein the soy protein material contains less than 1% starch;
    and a soy fiber material;
wherein the food product coating has a non-fiber carbohydrate content of not more than 5 grams non-fiber carbohydrate per serving, and wherein the liquid of the liquid batter protein material consists essentially of water, milk or beer.

2. The composition of claim 1 wherein the food product comprises beef, pork, lamb, poultry, seafood, vegetable, cheese or a meatless entree.

3. The composition of claim 1 wherein the food product coating has a non-fiber carbohydrate content of not more than 1 gram carbohydrate per serving.

4. The composition of claim 1 wherein the soy protein material of the liquid batter protein material is at least one of a soy protein concentrate containing at least 65% soy protein on a moisture free basis or a soy protein isolate containing at least 90% soy protein on a moisture free basis.

5. The composition of claim 1 wherein the soy protein material of the liquid batter protein material is a soy protein isolate containing at least 90% soy protein on a moisture free basis.

6. The composition of claim 1 further comprising a pre-dust protein material wherein the pre-dust protein material contains at least 50% soy protein material by weight on a moisture free basis and the pre-dust protein material is a textured soy protein of a soy protein concentrate or a soy protein isolate.

7. The composition of claim 6 wherein the soy protein material of the pre-dust soy protein material is at least one of a soy protein concentrate containing at least 65% soy protein or a soy protein isolate containing at least 90% soy protein.

8. The composition of claim 6 wherein the soy protein material of the pre-dust soy protein material is a soy protein isolate containing at least 90% soy protein.

9. The composition of claim 1, further comprising;
    a breading protein material containing at least 50% soy protein material by weight on a moisture free basis.

10. The composition of claim 9 wherein the breading protein material comprises at least one of a soy protein flour, a soy protein concentrate, a soy protein isolate or a hydrolyzed soy protein material.

11. The composition of claim 10 wherein the soy protein material of the breading protein material is at least one of a soy protein concentrate containing at least 65% soy protein on a moisture free basis or a soy protein isolate containing at least 90% soy protein on a moisture free basis.

12. The composition of claim 10 wherein the soy protein material of the breading protein material is a soy protein isolate containing at least 90% soy protein on a moisture free basis.

13. The composition of claim 9 further comprising a pre-dust protein material wherein the pre-dust protein material contains at least 50% soy protein material by weight on a moisture free basis.

14. The composition of claim 13 further comprising a liquid clear coat protein material comprising a liquid and a soy protein material, wherein the soy protein material contains less than 1% starch and wherein the liquid comprises water, milk or beer.

15. The composition of claim 13 wherein the soy protein material of the pre-dust soy protein material is at least one of a soy protein concentrate containing at least 65% soy protein or a soy protein isolate containing at least 90% soy protein.

16. The composition of claim 13 wherein the soy protein material of the pre-dust soy protein material is a soy protein isolate containing at least 90% soy protein.

17. The composition of claim 14 wherein the weight ratio of liquid to soy protein material in the liquid clear coat protein material is from about 3-40 to 1.

18. The composition of claim 17 wherein the soy protein material of the liquid clear coat protein material comprises at least one of a soy protein flour, a soy protein concentrate, a soy protein isolate or a hydrolyzed soy protein material.

19. The composition of claim 18 wherein the soy protein material of the liquid clear coat protein material is at least one of a soy protein concentrate containing at least 65% soy protein on a moisture free basis or a soy protein isolate containing at least 90% soy protein on a moisture free basis.

20. The composition of claim 18 wherein the soy protein material of the liquid clear coat protein material is a soy protein isolate containing at least 90% soy protein on a moisture free basis.

* * * * *